UNITED STATES PATENT OFFICE.

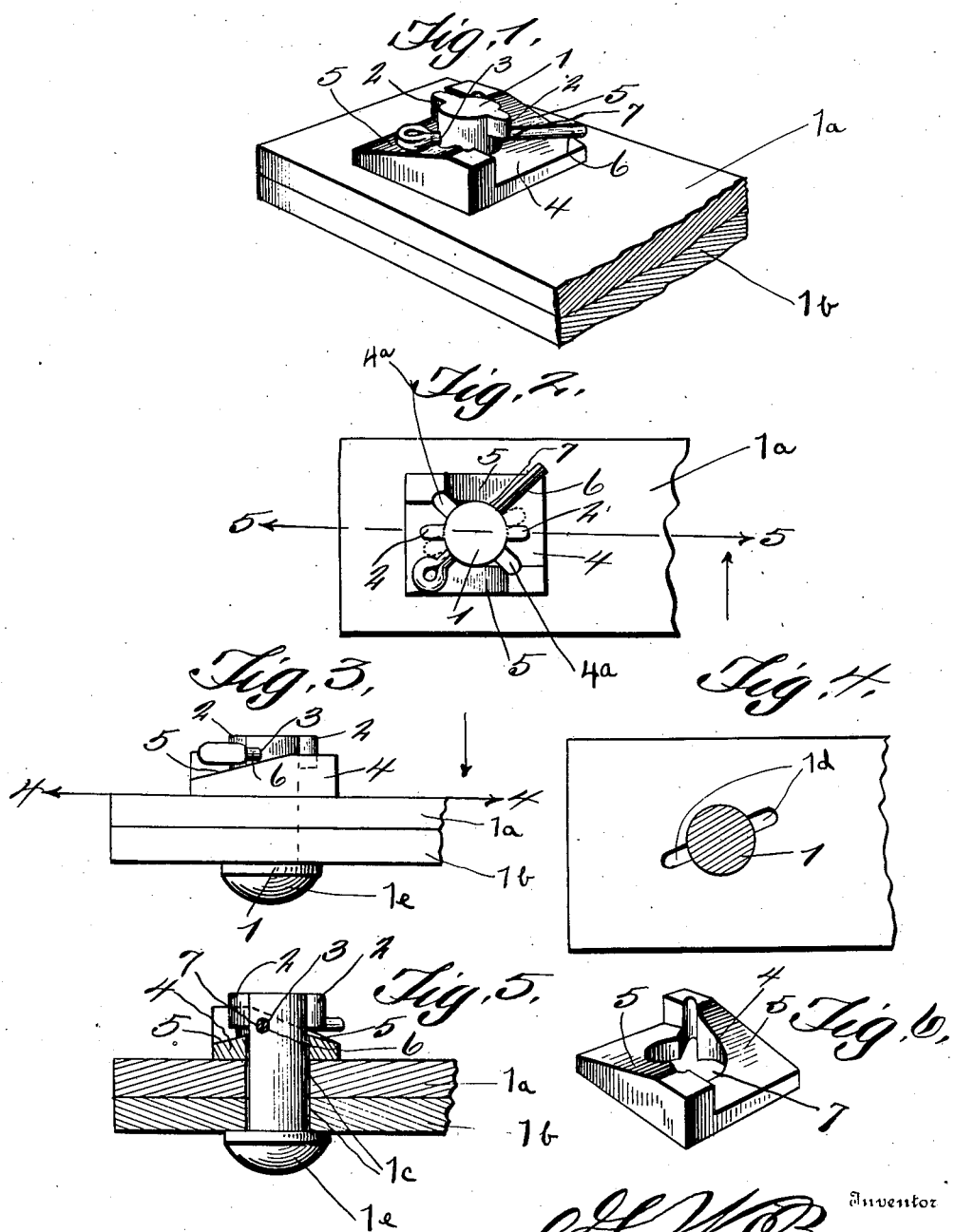

GEORGE W. BACON, OF GRAND JUNCTION, COLORADO, ASSIGNOR OF ONE-HALF TO EDGAR A. YELTON, OF GRAND JUNCTION, COLORADO.

THREADLESS NUT-LOCK.

969,325.  Specification of Letters Patent.  Patented Sept. 6, 1910.

Application filed April 24, 1908. Serial No. 429,031.

*To all whom it may concern:*

Be it known that I, GEORGE W. BACON, a citizen of the United States, residing at Grand Junction, in the county of Mesa and State of Colorado, have invented a new and useful Threadless Nut-Lock; and I do hereby declare the following to be a full, clear, and exact description of the invention, such as will enable others skilled in the art to which it appertains to make and use the same.

The invention relates to improvements in bolts and nuts and has for its object to provide a simple, durable and inexpensive device of this character constructed without threads and which can be quickly applied to a rail joint or the like.

In the drawings, Figure 1 is a perspective view of the device. Fig. 2 is a plan view thereof. Fig. 3 is an elevation of the same. Fig. 4 is a plan view partly in section with certain parts removed. Fig. 5 is a vertical section of the device to the parts shown in locked position. Fig. 6 is a detailed perspective view of the nut locking member.

Referring to the drawings 1 designates a bolt of the ordinary construction, but without threads, and in their stead, oppositely arranged lateral extending lugs 2 are provided. A transverse aperture or opening 3 extends at an angle to the lugs, and through the shank of the bolt, which is adapted to receive the member or pin 6, for the purpose hereinafter set forth.

4 designates a nut, provided with oppositely arranged inclined upper faces 5, as is clearly shown in Figs. 1 and 6. This nut is provided with an opening 7, for the reception of the said bolt. The said nut is further provided with recesses 4ª arranged diagonally one another upon either side of the said opening 7, adapted to admit of the said lugs 2, which lugs after passing through the said recesses are thrown out of registration with the recesses, by virtue of the bolt which may be turned sufficient to accomplish this action, and which prevents accidental removal of the said bolt.

The bolt and nut as shown in Fig. 1 as well as the other figures, are adapted to clamp plates 1ª and 1ᵇ securely together. These plates are provided with registering openings 1ᶜ, and arranged upon either side of these openings 1ᶜ are recesses 1ᵈ, which are adapted to register with the recesses 4ª, when it is desired to clamp the two plates together, by virtue of the nut and bolt.

The bolt 1 is provided with the usual head 1ᵉ, which is designed to engage the face of one of the plates, while the nut 4 is adapted to engage the face of the other plate. When the parts of the applicant's device are assembled as shown in Fig. 1, the bolt 1 has been turned sufficient to move the lugs 2 out of registration with the said recesses, and also sufficient to cause the member or pin 6 to frictionally engage the inclined faces of the nut, so as to clamp the plates securely together.

What is claimed is,

The combination of a bolt and nut, said nut having an opening to receive the end of said bolt and provided with oppositely arranged recesses, said bolt having oppositely arranged lugs adjacent to its end adapted to engage said recesses when the nut is being applied to the bolt, said nut having oppositely disposed inclined upper faces, said bolt having an aperture extending transversely thereof and adjacent its end, and at an angle to the disposition of said lugs, a key penetrating said aperture adapted to be engaged by the said inclined upper faces so that when the bolt or nut is rotated in a certain direction the bolt or nut will be drawn home.

In testimony whereof I have signed my name to this specification in the presence of two subscribing witnesses.

GEORGE W. BACON.

Witnesses:
 ALBERT BLACKBURN,
 C. E. KIZER.